United States Patent
Maeshiro (10) Patent No.: US 9,994,175 B2
(45) Date of Patent: Jun. 12, 2018

(54) SYSTEM FOR PRECONDITIONING A VEHICLE AND METHOD THEREOF

(71) Applicant: Honda Motor Co., Ltd., Minato-ku, Tokyo (JP)

(72) Inventor: Shinji Maeshiro, Cypress, CA (US)

(73) Assignee: HONDA MOTOR CO., LTD., Tokyo (JP)

( * ) Notice: Subject to any disclaimer, the term of this patent is extended or adjusted under 35 U.S.C. 154(b) by 0 days. days.

(21) Appl. No.: 15/061,429

(22) Filed: Mar. 4, 2016

(65) Prior Publication Data

US 2017/0253201 A1 Sep. 7, 2017

(51) Int. Cl.
*B60R 16/03* (2006.01)
*B60R 16/037* (2006.01)
*B60S 1/08* (2006.01)
*G06K 9/00* (2006.01)
*H04N 5/33* (2006.01)

(52) U.S. Cl.
CPC .......... *B60R 16/037* (2013.01); *B60S 1/0844* (2013.01); *G06K 9/00791* (2013.01); *H04N 5/33* (2013.01)

(58) Field of Classification Search
CPC . B60R 16/037; B60S 1/0844; G06K 9/00791; H04N 5/33
USPC .......................................................... 701/2
See application file for complete search history.

(56) References Cited

U.S. PATENT DOCUMENTS

| 5,313,072 | A * | 5/1994 | Vachss ................. B60S 1/0822 250/227.25 |
| 6,392,218 | B1 | 5/2002 | Kuehnle |
| 7,019,275 | B2 | 3/2006 | Stam et al. |
| 7,062,362 | B2 | 6/2006 | Obradovich et al. |
| 7,650,864 | B2 * | 1/2010 | Hassan ................. B60R 25/045 123/179.2 |
| 7,860,275 | B2 | 12/2010 | Lelevé et al. |
| 7,980,341 | B2 * | 7/2011 | Fernandez ................ B60L 1/00 180/65.275 |
| 2004/0232773 | A1 * | 11/2004 | Parker ....................... B60R 1/04 307/10.1 |
| 2005/0115308 | A1 * | 6/2005 | Koram ............. B32B 17/10036 73/73 |
| 2006/0244588 | A1 * | 11/2006 | Hannah ................... A47F 10/04 340/539.13 |

(Continued)

FOREIGN PATENT DOCUMENTS

EP 2679418 A1 1/2014

OTHER PUBLICATIONS

Gormer, S. et al., "Vision-based Rain Sensing With an In-Vehicle Camera," Intelligent Vehicle Symposium, 2009. Proceedings. p. 279-284 (2009), 6 pages.

(Continued)

*Primary Examiner* — Anne M Antonucci
*Assistant Examiner* — James E Stroud
(74) *Attorney, Agent, or Firm* — Arent Fox LLP (57) ABSTRACT

An environmental condition outside of a vehicle can be detected via a camera or sensor. A notification of the environmental condition can be sent to a remote device via a telematics system. A command can be received from the remote device in response to the notification via the telematics system, wherein the command is related to a vehicle system of the vehicle. The command can be communicated to the vehicle system to cause a preconditioning of the vehicle.

20 Claims, 7 Drawing Sheets

(56) References Cited

U.S. PATENT DOCUMENTS

| | | | |
|---|---|---|---|
| 2007/0157720 A1* | 7/2007 | Veerasamy | B32B 17/10036 73/170.17 |
| 2007/0227718 A1 | 10/2007 | Hill et al. | |
| 2008/0234895 A1* | 9/2008 | Veerasamy | B32B 17/10036 701/36 |
| 2009/0134830 A1* | 5/2009 | Kokuryo | B60S 1/0822 318/483 |
| 2010/0235046 A1 | 9/2010 | Proefke et al. | |
| 2011/0106375 A1 | 5/2011 | Gurusamy Sundaram | |
| 2011/0128543 A1* | 6/2011 | Choi | B60S 1/0833 356/342 |
| 2012/0234930 A1 | 9/2012 | Wijaya | |
| 2013/0019618 A1* | 1/2013 | Veerasamy | B32B 17/10036 62/85 |
| 2013/0024169 A1* | 1/2013 | Veerasamy | B32B 17/10036 703/2 |
| 2013/0079978 A1 | 3/2013 | Uyeki | |
| 2014/0049774 A1* | 2/2014 | Horii | G01N 21/274 356/237.3 |
| 2014/0232868 A1 | 8/2014 | Schwarz et al. | |
| 2015/0088374 A1 | 3/2015 | Yopp et al. | |
| 2015/0210287 A1 | 7/2015 | Penilla et al. | |
| 2016/0068138 A1* | 3/2016 | Shami | B60S 1/026 134/6 |
| 2016/0260158 A1* | 9/2016 | High | H04W 4/80 |
| 2016/0261990 A1* | 9/2016 | Zimmermann | H04W 4/029 |
| 2017/0072810 A1* | 3/2017 | Cun | B60L 11/1842 |

OTHER PUBLICATIONS

Kurihata, H. et al., "Rainy Weather Recognition from In-Vehicle Camera Images for Driver Assistance," Intelligent Vehicles Symposium, 2005. Proceedings. p. 205-210 (2005), 6 pages.

* cited by examiner

SYSTEM FOR PRECONDITIONING A VEHICLE AND METHOD THEREOF

BACKGROUND

Vehicles can be equipped with telematics systems to facilitate intercommunication with vehicle systems and/or other systems, which can allow for accessing interfaces to obtain vehicle system data, issue vehicle system commands, and/or the like. For example, a telematics system can also allow for communicating with certain vehicle systems via an external communication device over one or more networks. For example, telematics systems can provide health status information of vehicle systems (e.g., battery charge level, oil life, fuel level, engine temperature, collision notification, or other system status information) to one or more remote devices, and allow remote devices to interact with the vehicle systems to unlock doors.

Recently, telematics systems are configured to communicate with smart phone applications via a wireless communication medium (e.g., via cellular or other network communications with the telematics system, Bluetooth or other short range communications with the telematics system). In this regard, a smart phone application can communicate with the telematics system remotely to unlock/lock doors, start the vehicle engine, flash vehicle lights or sound the horn, or control the climate system.

SUMMARY

The following presents a summary of one or more aspects of the disclosure in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects of the disclosure in a simplified form as a prelude to the more detailed description that is presented later.

In an example, a method of preconditioning a vehicle is provided. The method includes detecting an environmental condition outside of a vehicle via a camera or other sensor, sending a notification of the environmental condition to a remote device via a telematics system, receiving a command from the remote device in response to the notification via the telematics system, wherein the command is related to a vehicle system of the vehicle, and communicating the command to the vehicle system to cause a preconditioning of the vehicle.

In another example, a vehicle is provided that includes a camera for detecting an environmental condition outside of the vehicle, a telematics system for sending a notification of the environmental condition to a remote device and receiving a command from the remote device in response to the notification, wherein the command is related to a vehicle system of the vehicle. The vehicle also includes an electronic control unit for communicating with at least one vehicle system, wherein the electronic control unit communicates the command to the vehicle system to cause a preconditioning of the vehicle.

In a further example, a non-transitory computer-readable medium storing computer executable code for indicating vehicle presence is provided. The code includes code for detecting an environmental condition outside of a vehicle via a camera, sending a notification of the environmental condition to a remote device via a telematics system, receiving a command from the remote device in response to the notification via the telematics system, wherein the command is related to a vehicle system of the vehicle, and communicating the command to the vehicle system to cause a preconditioning of the vehicle.

To the accomplishment of the foregoing and related ends, the one or more aspects of the disclosure comprise the features hereinafter fully described and particularly pointed out in the claims. The following description and the annexed drawings set forth in detail certain illustrative features of the one or more aspects. These features are indicative, however, of but a few of the various ways in which the principles of various aspects can be employed, and this description is intended to include all such aspects and their equivalents.

BRIEF DESCRIPTION OF THE DRAWINGS

The novel features believed to be characteristic of aspects described herein are set forth in the appended claims. In the descriptions that follow, like parts are marked throughout the specification and drawings with the same numerals, respectively. The drawing figures are not necessarily drawn to scale and certain figures can be shown in exaggerated or generalized form in the interest of clarity and conciseness. The disclosure itself, however, as well as a preferred mode of use, further objects and advances thereof, will be best understood by reference to the following detailed description of illustrative embodiments when read in conjunction with the accompanying drawings, wherein:

DETAILED DESCRIPTION

The following includes definitions of selected terms employed herein. The definitions include various examples and/or forms of components that fall within the scope of a term and that can be used for implementation. The examples are not intended to be limiting.

The term "bus," as used herein, can refer to an interconnected architecture that is operably connected to transfer data between computer components within a singular or multiple systems. The bus can be a memory bus, a memory controller, a peripheral bus, an external bus, a crossbar switch, and/or a local bus, among others. The bus can also be a vehicle bus that interconnects components inside a vehicle using protocols such as Controller Area network (CAN), Local Interconnect Network (LIN), among others.

The term "memory," as used herein, can include volatile memory and/or nonvolatile memory. Non-volatile memory can include, for example, ROM (read only memory), PROM (programmable read only memory), EPROM (erasable PROM) and EEPROM (electrically erasable PROM). Volatile memory can include, for example, RAM (random access memory), synchronous RAM (SRAM), dynamic RAM (DRAM), synchronous DRAM (SDRAM), double data rate SDRAM (DDR SDRAM), and direct RAM bus RAM (DRRAM).

The term "operable connection," as used herein, can include a connection by which entities are "operably connected", is one in which signals, physical communications, and/or logical communications can be sent and/or received. An operable connection can include a physical interface, a data interface and/or an electrical interface.

The term "processor," as used herein, can refer to a device that processes signals and performs general computing and arithmetic functions. Signals processed by the processor can include digital signals, data signals, computer instructions, processor instructions, messages, a bit, a bit stream, or other computing that can be received, transmitted and/or detected. A processor, for example, can include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described herein.

The term "remote device," as used herein, can refer to a device that is remote in location to a vehicle that can communicate with a vehicle via a telematics system in the vehicle (e.g., using a wireless communication technology such as a cellular technology, Bluetooth, etc.) to receive data from one or more vehicle systems, send commands to one or more vehicle systems, etc. For example, the remove device can be a smart phone, tablet, computer, etc.

The term "telematics system," as used herein, can refer to a system that facilitates intercommunication among vehicle systems, communication with the vehicle systems via one or more other systems or devices, etc. In an example, telematics systems can interface with other systems, such as a remote device, other computers, etc., via a wireless communication technology, such as a cellular technology, Bluetooth, etc. using a corresponding modem or transceiver.

The term "vehicle," as used herein, can refer to any moving vehicle that is capable of carrying one or more human occupants and is powered by any form of energy. The term "vehicle" can include, but is not limited to: cars, trucks, vans, minivans, SUVs, motorcycles, scooters, boats, personal watercraft, and aircraft. In some cases, a motor vehicle includes one or more engines.

The term "vehicle operator," as used herein, can refer to an entity (e.g., a person or other being, robot or other mobile unit, etc.) that can operate a vehicle. The vehicle operator can carry a remote device or other mechanism for activating one or more vehicle systems or other components of the vehicle.

The term "vehicle system," as used herein, can refer to an electronically controlled system on a vehicle operable to perform certain actions on components of the vehicle, which can provide an interface to allow operation by another system or graphical user interaction. The vehicle systems can include, but are not limited to, vehicle ignition systems, vehicle conditioning systems (e.g., systems that operate a windshield wiper motor, a windshield washer fluid motor or pump, a defroster motor, heating, ventilating, and air conditioning (HVAC) controls, etc.), vehicle audio systems, vehicle security systems, vehicle video systems, vehicle infotainment systems, vehicle telephone systems, and the like.

The detailed description set forth below in connection with the appended drawings is intended as a description of various configurations and is not intended to represent the only configurations in which the concepts described herein can be practiced. The detailed description includes specific details for the purpose of providing a thorough understanding of various concepts. However, it will be apparent to those skilled in the art that these concepts can be practiced without these specific details. In some instances, well known structures and components are shown in block diagram form in order to avoid obscuring such concepts.

Several aspects of certain systems will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements can be implemented using electronic hardware, computer software, or any combination thereof. Whether such elements are implemented as hardware or software depends upon the particular application and design constraints imposed on the overall system.

By way of example, an element, or any portion of an element, or any combination of elements can be implemented with a "processing system" that includes one or more processors. One or more processors in the processing system can execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more aspects, the functions described can be implemented in hardware, software, firmware, or any combination thereof. If implemented in software, the functions can be stored on or encoded as one or more instructions or code on a computer-readable medium. Computer-readable media includes computer storage media. Storage media can be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer.

Figure 1:
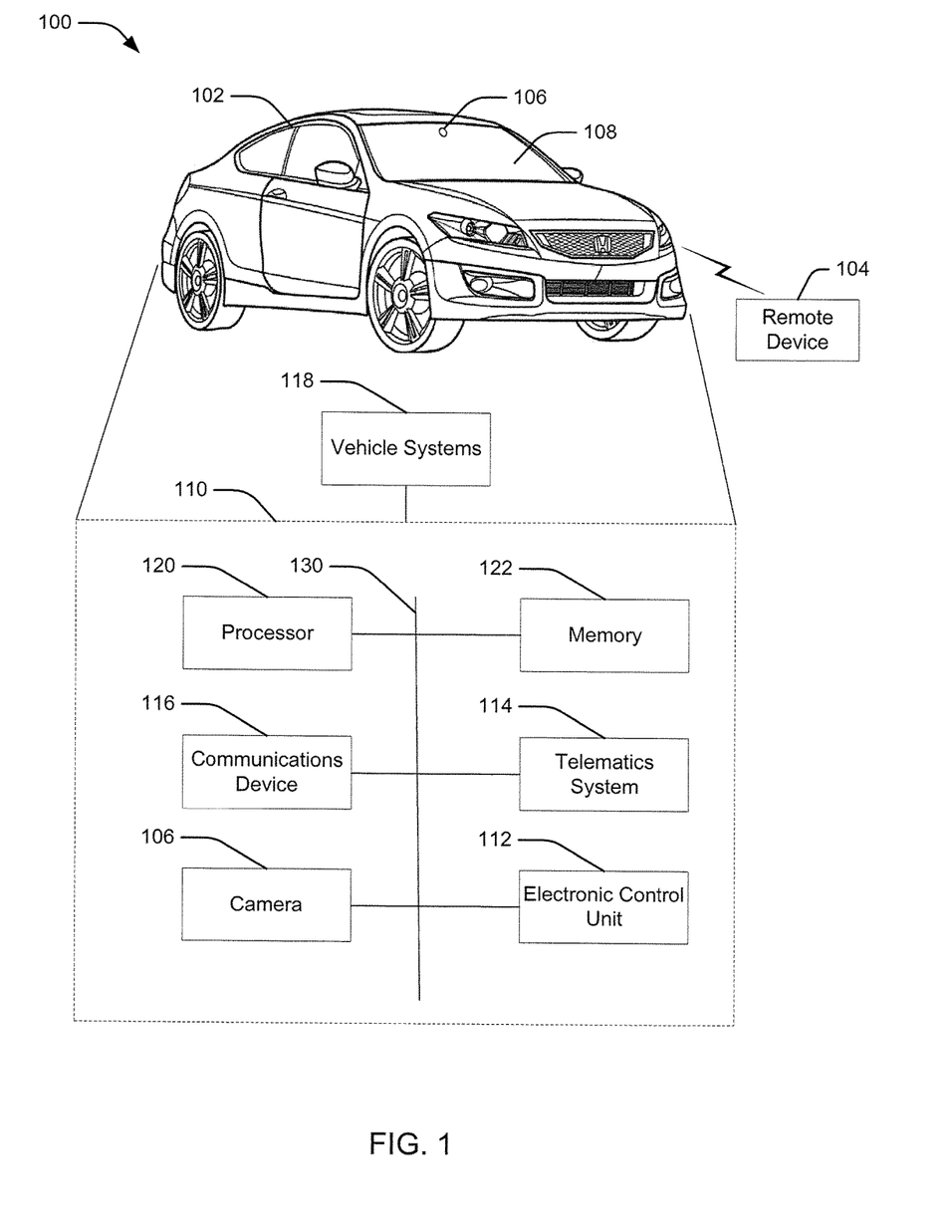
FIG. 1 illustrates a schematic view of an example operating environment of a vehicle preconditioning system according to one aspect of the disclosure.

FIG. 1 shows a schematic view of an example operating environment 100 of a vehicle preconditioning system 110 and example methods according to aspects described herein. For example, operating environment 100 can include a vehicle 102 within which the vehicle preconditioning system 110 can reside. Operating environment 100 can also include a remote device 104 that can communicate with the vehicle 102 to receive data therefrom, issue commands to vehicle systems in the vehicle 102, etc., among other functions. Components of the vehicle preconditioning system 110, as well as the components of other systems, hardware architectures and software architectures discussed herein, can be combined, omitted or organized into different architectures for various aspects of the disclosure. However, the example aspects and configurations discussed herein focus on the operating environment 100 as illustrated in FIG. 1, with corresponding system components and related methods.

As shown in FIG. 1, a vehicle 102 can include a camera 106 or other sensor, such as a moisture or humidity sensor, shown on the vehicle behind the windshield 108 in one specific example and also within vehicle preconditioning system 110 as operatively coupled to the bus 130. In an example, camera 106 can be used to detect one or more environmental conditions outside of the vehicle 102, such as precipitation in the form of condensation detected on windshield 108. For example, the camera 106 can be positioned on or facing outwardly of the windshield 108, one or more windows, a rear window, etc. In addition, for example, the vehicle 102 can include or can be operably coupled with an electronic control unit (ECU) 112 that operably controls a plurality of vehicle systems 118. The vehicle systems 118 include, but are not limited to, vehicle ignition systems, vehicle conditioning systems, vehicle audio systems, vehicle security systems, vehicle video systems, vehicle infotainment systems, vehicle telephone systems, and the like, as described above. For example, ECU 112 can control starting/shutting down of an ignition of the vehicle, operation of a windshield wiper motor, operation of a windshield washer fluid motor or pump, operation of a defroster motor, operation of other components of the HVAC system to circulate air in the vehicle, operation of door locks, windows and an audio system, among other functions, and/or can provide a graphical user or programmatic interface to allow operators or other devices (e.g., processor 120 executing functions described herein) to control such aspects of the vehicle 102.

The vehicle preconditioning system 110 can also include or can be operably coupled with a telematics system to allow external access to interfaces provided by the ECU 112 for communicating with one or more vehicle systems 118. For example, the telematics system 114 can be operable to communicate using one or more communications devices 116 that can transmit and receive wireless signals to a remote device 104 using an electronic communication technology, such as a cellular or other wireless technology (e.g., a third generation partnership project (3GPP) cellular technology, local area network (LAN) technology, Bluetooth®, etc.). In this regard, the telematics system 114 can act as a gateway between the remote device 104 and one or more vehicle systems 118 to allow the remote device 104 to cause one or more actions on one or more vehicle systems 118, receive data from the one or more vehicle systems 118, etc. In addition, communications to/from the telematics system 114 can be secured using one or more security protocols, such an encryption/decryption mechanism (e.g., public/private key pair), credential authentication, etc.

The vehicle preconditioning system 110 can also include or be operably coupled with (or executed by) one or more processors 120 and one or more memories 122 that communicate to effectuate certain actions at the vehicle 102 (e.g., actions on or associated with ECU 112, telematics system 114, communications device(s) 116, camera 106, and/or other components described herein). In one example, one or more of the camera 106, ECU 112, telematics system 114, communications device(s) 116, processor(s) 120 and/or memory(ies) 122 can be connected via one or more buses 130. Moreover, vehicle systems 118 can include a processor and/or memory, and/or can be operated by processor 120 and/or can utilize memory 122 to effectuate certain actions on the vehicle 102 (e.g., operation of motors, pumps, locks, or other mechanical, electro-mechanical, or electronic devices of the vehicle 102, etc.).

In addition, the ECU 112 can additionally or alternatively include a processor, memory (e.g., internal processing memory), an interface circuit, and/or buses for transferring data, sending commands, and communicating with the vehicle systems (not shown). In addition, communications device 116, as described, can include substantially any wireless device or related modem for providing wireless computer communications utilizing various protocols to send/receive electronic signals internally to features and systems within the vehicle 102 and/or to external devices. In an example, communications device 116 can communicate using one or more radio technologies (e.g., 3GPP radio access technologies, IEEE 802.11, Bluetooth®, etc.).

Figure 2:
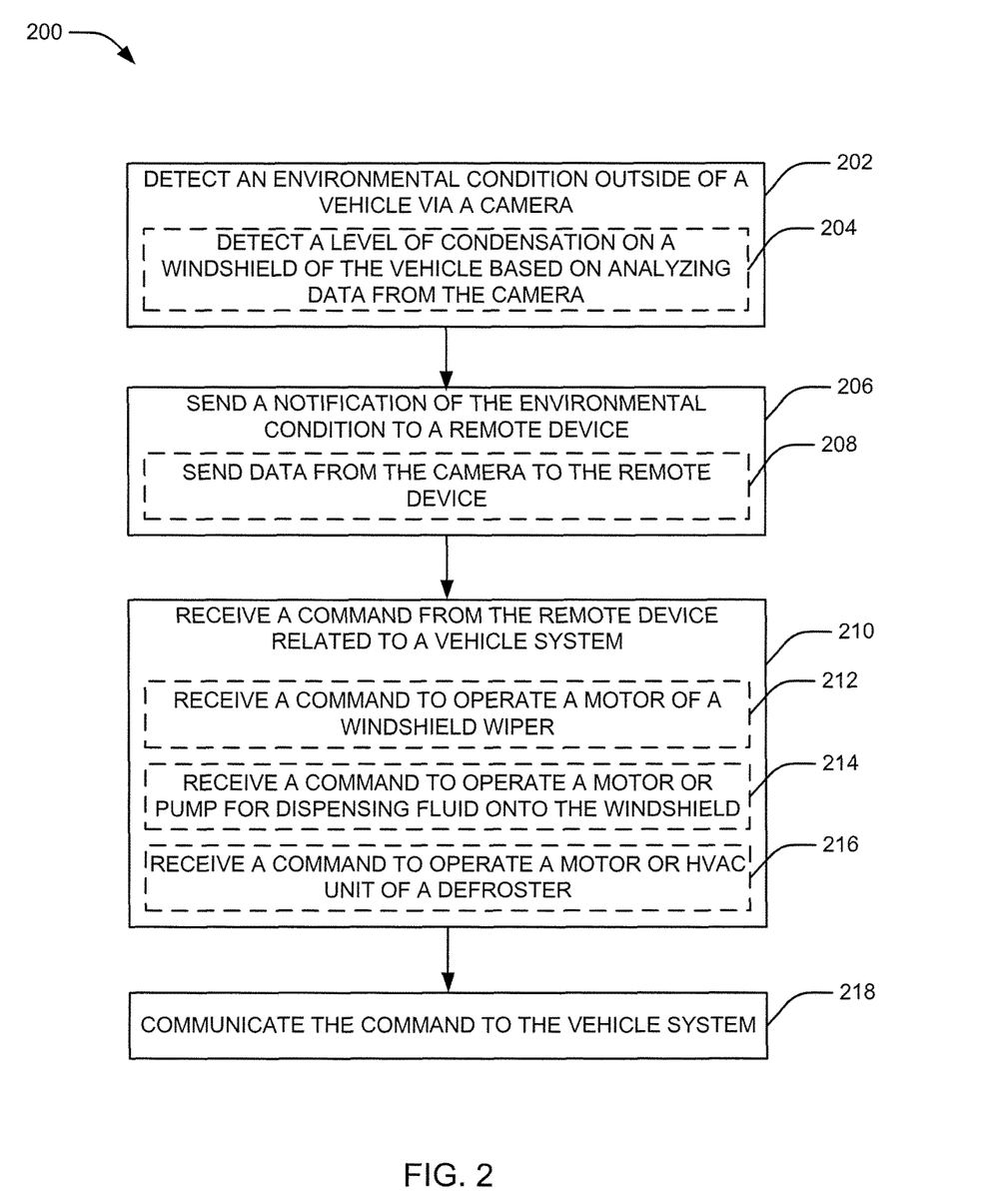
FIG. 2 illustrates a flowchart showing an example method for performing preconditioning of a vehicle according to one aspect of the disclosure.

Referring now to FIG. 2, which is described in conjunction with the example operating environment 100 of FIG. 1, an example method 200 for preconditioning vehicle (e.g., which can be used by the vehicle preconditioning system 110) is illustrated. In block 202, the method 200 can include detecting an environmental condition outside of a vehicle via a camera. In an aspect, vehicle preconditioning system 110 (e.g., in conjunction with processor 120 and/or memory 122) can detect the environmental condition outside of the vehicle 102 via the camera 106 (e.g., vie one or more images, a video feed, etc. from the camera). As described, camera 106 can be positioned to capture images outwardly from the vehicle. The camera 106, for example, can be positioned behind windshield 108 (e.g., affixed to the windshield, a rearview mirror, a dashboard, etc.) to capture images or other data outside of the vehicle 102. The camera 106 can be additionally or alternatively positioned to capture images or other data outside of one or more side windows, a rear window, a sunroof, etc. For instance, the camera can include one or more of a visible camera configured to capture images, video etc., an infrared camera configured to capture thermal data, and/or the like. In any case, vehicle preconditioning system 110 can analyze the images, video, thermal data, etc. to detect one or more environmental conditions occurring outside of the vehicle.

In one specific example, in block 204, detecting the environmental condition can optionally include detecting a level of condensation on a windshield of the vehicle based on analyzing data from the camera. In an aspect, vehicle preconditioning system 110 (e.g., in conjunction with processor 120 and/or memory 122) can detect the level of condensation on the windshield 108 of the vehicle 102 based on analyzing data from the camera 106. For example, vehicle preconditioning system 110 can analyze the data as one or more images from camera 106 (e.g., where camera 106 is a visible camera), thermal data from camera 106 (e.g., where camera 106 is an infrared camera), etc., to detect the level of condensation. For example, camera 106 can capture one or more images or thermal data through windshield 108, and can evaluate the one or more images or thermal data to determine whether a level of condensation or snow exists on one or more locations of the windshield 108 (e.g., based on detection of water droplets or snow flakes, detection of a layer of fog, etc. through image processing, temperature detection, and/or the like).

In addition, in some examples, vehicle preconditioning system 110 can use the data from the camera along with other data (e.g., from the telematics system 114 or other vehicle systems 118) to detect the environmental condition and/or to generate a notification of the environmental condition. For example, a climate control system of the vehicle systems 118 can be used to determine a temperature at the exterior of the vehicle, which can indicate whether condensation is frozen (e.g., ice or snow, etc.) as opposed to rain, mist, etc. This can impact the preconditioning parameters selected by the vehicle 102 or remote device 104, as described further herein. In another example, a global positioning system (GPS) system of vehicle systems 118 can determine a location of the vehicle 102, and telematics system 114 can determine local weather (and/or forecast) for the location (e.g., rain, snow, temperature, humidity, etc.) to determine whether the condensation is rain, ice, snow, etc. Moreover, the GPS system can determine the location as in a parking garage and/or can interpret a strength of the GPS signal as being in an enclosed space or not, and can accordingly determine the environmental condition (e.g., type of condensation) detected by camera 106. In another example, if the location is determined not to be in a parking garage or other indoor structure, precondition parameters can be modified to protect the vehicle from operating the preconditioning systems (e.g., windshield wipers, washer fluid dispenser, etc.) in freezing conditions—for example, a defroster can be utilized for a longer period of time when the location of the vehicle is determined to be outside before initiating a windshield wiper motor.

In block 206, the method 200 can include sending a notification of the environmental condition to a remote device. In an aspect, telematics system 114 (e.g., in conjunction with processor 120 and/or memory 122) can send the notification of the environmental condition to the remote device 104. For example, vehicle preconditioning system 110 can utilize the telematics system 114 to transmit the notification to the remote device 104 based on detecting the environmental condition. As described, for example, telematics system 114 can transmit the notification to the remote device 104 using a wireless communication technology, such as a cellular technology (e.g., 3GPP), LAN technology (e.g., IEEE 802.11), short-range communication (e.g., Bluetooth®), etc. In an example, vehicle preconditioning system 110 can include, with the notification, an option to precondition the vehicle 102 such that remote device 104 can cause preconditioning of the vehicle 102 by selecting the option. In another example, an application on remote device 104 can define the command for preconditioning the vehicle 102 and can accordingly transmit the command to the vehicle 102 via telematics system 114.

In block 208, for example, sending the notification can optionally include sending data from the camera to the remote device. In an aspect, telematics system 114 (e.g., in conjunction with processor 120 and/or memory 122) can send the data from the camera 106 to the remote device 104. For example, the data can include one or more images or a video feed from the camera 106 (e.g., depicting the view from inside of the vehicle 102 looking outwardly through the windshield 108 or other window, sunroof, etc.), one or more thermal metrics, etc. As described further herein, the images, video feed, thermal metrics, etc. can be used to determine whether to precondition the vehicle 102 via a command from the remote device 104 before a vehicle operator enters the vehicle 102.

In block 210, method 200 can include receiving a command from the remote device related to a vehicle system. In an aspect, communications device 116 (e.g., in conjunction with processor 120 and/or memory 122) can receive the command from the remote device 104 related to the vehicle system (e.g., one of vehicle systems 118). For example, communications device 116 can provide the command to telematics system 114, which can interface with ECU 112 to activate the command on the vehicle system. For example, the command can correspond to activating one or more components of the vehicle system (e.g., a mechanical, electro-mechanical, or electronic component) to cause an action on the vehicle 102. In addition, in one example, the command can include one or more parameters for executing the command, which can be related to time (e.g., a time period or interval for executing the command) or other configurable settings, such as a power (e.g., for a motor or pump) and a temperature (e.g., for a defroster or other HVAC component), among other settings.

For example, in block 212, receiving the command can optionally include receiving a command to operate a motor of a windshield wiper. In an aspect, communications device 116 (e.g., in conjunction with processor 120 and/or memory 122) can receive the command to operate the motor of the windshield wiper from the remote device 104, and can provide the command to telematics system 114. For example, the command received from the remote device 104 can include one or more parameters for operating the motor of the windshield wiper (e.g., a time period for operation, a speed and/or intermittent wiper delay setting, an interval for operation, etc.). In other examples, additional wipers can be activated in this regard, such as rear window wipers, headlamp wipers, etc., of vehicle 102.

In another example, in block 214, receiving the command can optionally include receiving a command to operate a motor or pump for dispensing fluid onto the windshield. In an aspect, communications device 116 (e.g., in conjunction with processor 120 and/or memory 122) can receive the command to operate the motor or pump for dispensing fluid onto the windshield from the remote device 104, and can provide the command to telematics system 114. For example, the command received from the remote device 104 can include one or more parameters for operating the motor or pump to dispense fluid onto the windshield (e.g., a time period for operation, an interval for operation, an amount of fluid to dispense, etc.). In other examples, additional fluid motors/pumps can be activated in this regard, such as motors/pumps to dispense fluid on a rear window, side window, headlamps, etc., of vehicle 102.

In another example, in block 216, receiving the command can optionally include receiving a command to operate a motor or HVAC unit of a defroster. In an aspect, communications device 116 (e.g., in conjunction with processor 120 and/or memory 122) can receive the command to operate the motor or HVAC unit of the defroster from the remote device 104, and can provide the command to telematics system 114. For example, the command received from the remote device 104 can include one or more parameters for operating the motor or HVAC unit of the defroster (e.g., a time period for operation, an interval for operation, and a temperature for air being blown from the defroster, among other factors). For example, the defroster can be for a windshield, rear window, side windows, sunroof, headlamps, mirrors, etc. of vehicle 102.

In block 218, method 200 can include communicating the command to the vehicle system. In an aspect, telematics system 114 (e.g., in conjunction with processor 120 and/or memory 122) can communicate the command to the vehicle system 118. For example, telematics system 114 can communicate the command (e.g., along with one or more parameter related to the command, as described above) to the vehicle system 118 via ECU 112. Thus, for example, ECU 112 can cause one or more vehicle systems 118 to operate vehicle 102 components such as windshield wipers, windshield fluid dispensers, defrosters, etc., based on the command and/or related parameters. Thus, for example, telematics system 114 can instruct the vehicle system 118 related to windshield wipers of the vehicle 102 to operate the motor controlling the windshield wipers for a time period specified by the command, the time interval specified by the command, the speed or intermittent delay specified by the command, etc. In another example, telematics system 114 can continue to communicate the command to the vehicle system 118 until the environmental condition detected by vehicle preconditioning system 110 no longer exists (e.g., one the level of condensation is no longer present on the windshield 108).

In one example, the command can be automatically generated by vehicle preconditioning system 110 without instruction from the remote device 104 for one or more detections of environmental conditions (e.g., based on a type of condition detected, a number of consecutive detections within a period of time, etc.). In yet another example, camera 106 can capture a windshield image before the car is turned off, and/or can determine time, temperature, humidity, and current conditioning of the vehicle at the time of turning off the vehicle (or shortly before). Vehicle preconditioning system 110 can use this information to determine preconditioning for the vehicle 102 (e.g., whether to activate the wiper motor, a speed or intermittent delay for the wipers, whether to dispense washer fluid, etc.). Further examples of automated preconditioning are described in FIG. 3 below.

Figure 3:
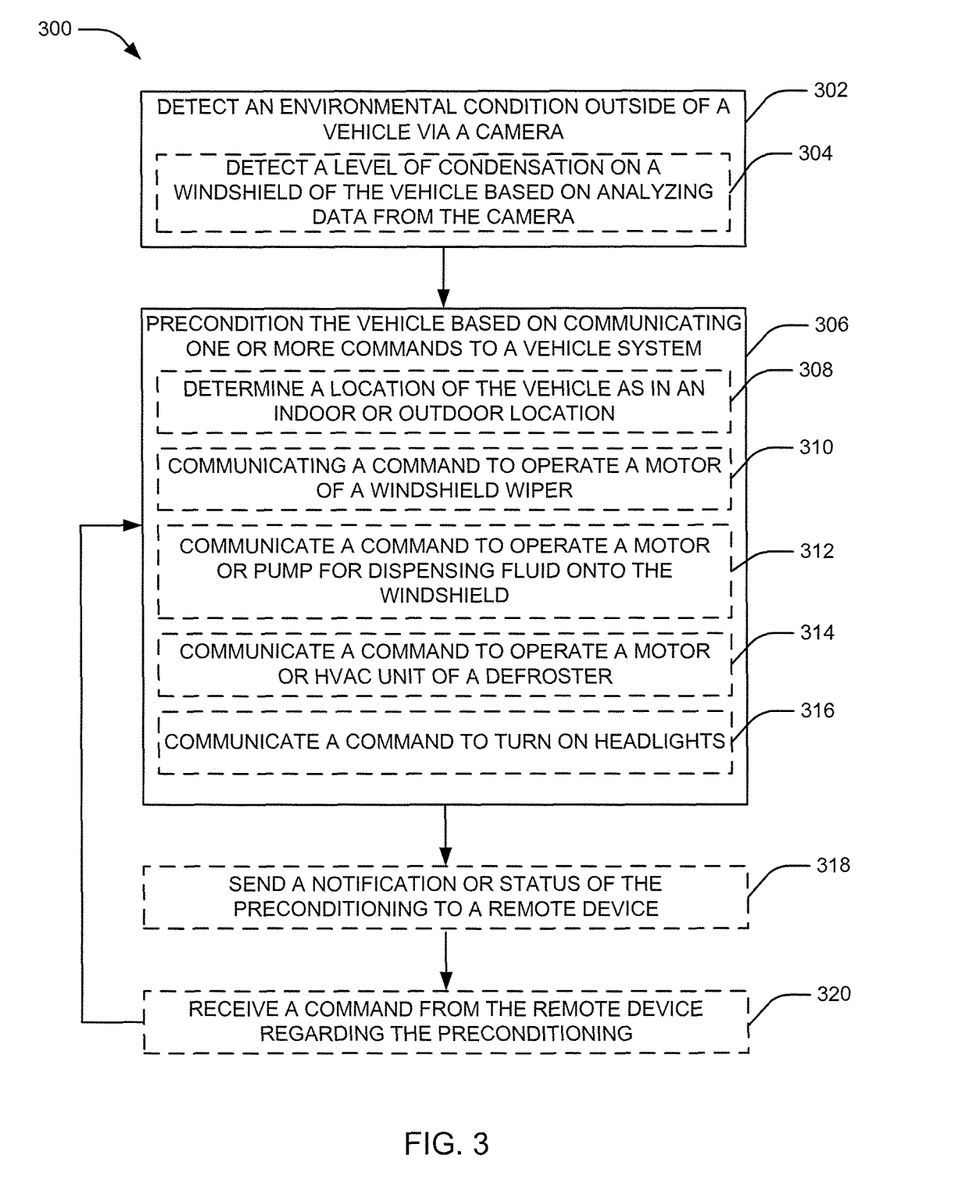
FIG. 3 illustrates a flowchart showing an example method for preconditioning a vehicle according to one aspect of the disclosure.

Referring now to FIG. 3, which is described in conjunction with the example operating environment 100 of FIG. 1, an example method 300 for preconditioning vehicle (e.g., which can be used by the vehicle preconditioning system 110) is illustrated. In block 302, the method 300 can include detecting an environmental condition outside of a vehicle via a camera. In an aspect, vehicle preconditioning system 110 (e.g., in conjunction with processor 120 and/or memory 122) can detect the environmental condition outside of the vehicle 102 via the camera 106 (e.g., vie one or more images, a video feed, etc. from the camera). As described, camera 106 can be positioned to capture images outwardly from the vehicle. The camera 106, for example, can be positioned behind windshield 108 (e.g., affixed to the windshield, a rearview mirror, a dashboard, etc.) to capture images or other data outside of the vehicle 102. The camera 106 can be additionally or alternatively positioned to capture images or other data outside of one or more side windows, a rear window, a sunroof, etc. For instance, the camera can include one or more of a visible camera configured to capture images, video etc., an infrared camera configured to capture thermal data, and/or the like. In any case, vehicle preconditioning system 110 can analyze the images, video, thermal data, etc. to detect one or more environmental conditions occurring outside of the vehicle.

In one specific example, in block 304, detecting the environmental condition can optionally include detecting a level of condensation on a windshield of the vehicle based on analyzing data from the camera. In an aspect, vehicle preconditioning system 110 (e.g., in conjunction with processor 120 and/or memory 122) can detect the level of condensation on the windshield 108 of the vehicle 102 based on analyzing data from the camera 106. For example, vehicle preconditioning system 110 can analyze the data as one or more images from camera 106 (e.g., where camera 106 is a visible camera), thermal data from camera 106 (e.g., where camera 106 is an infrared camera), etc., to detect the level of condensation. For example, camera 106 can capture one or more images or thermal data through windshield 108, and can evaluate the one or more images or thermal data to determine whether a level of condensation or snow exists on one or more locations of the windshield 108 (e.g., based on detection of water droplets or snow flakes, detection of a layer of fog, etc. through image processing, temperature detection, and/or the like). In addition, in some examples, vehicle preconditioning system 110 can use the data from the camera along with other data (e.g., from the telematics system 114 or other vehicle systems 118), as described, to detect the environmental condition and/or to generate a notification of the environmental condition.

In block 306, the method 300 can include preconditioning a vehicle based on communicating one or more commands to a vehicle system. In an aspect, vehicle preconditioning system 110 (e.g., in conjunction with processor 120 and/or memory 122) can precondition the vehicle based on communicating one or more commands to the vehicle system. As described, vehicle preconditioning system 110 can precondition the vehicle based on detecting the environmental condition, where the preconditioning can occur automatically by the vehicle preconditioning system 110 and/or based on notifying/receiving instruction from a remote device 104. Moreover, vehicle preconditioning system 110 can precondition the vehicle for a period of time, based on further obtaining images via camera 106 after a period of time to determine when preconditioning is sufficient to substantially clear condensation from the windshield, etc.

In an example, preconditioning the vehicle at block 306 can optionally include, at block 308, determining a location of the vehicle as in an indoor or outdoor location. For example, vehicle preconditioning system 110 (e.g., in conjunction with processor 120 and/or memory 122) can determine the location of the vehicle as in an indoor or outdoor location. In an example, vehicle preconditioning system 110 can determine the location of the vehicle based at least in part on a GPS system of the vehicle that determines the location of the vehicle based on GPS signals or other location determining systems (e.g., based on other terrestrial signals, such as signals from cellular base stations, etc.). In this example, vehicle preconditioning system 110 can determine whether the location of the vehicle is indoor (e.g., a parking garage or covered lot) or not. Whether the vehicle is determined to be in an indoor or outdoor location can impact preconditioning parameters, as described above and further herein.

In another example, preconditioning the vehicle at block 306 can optionally include, at block 310, communicating a command to operate a motor of a windshield wiper. For example, vehicle preconditioning system 110 (e.g., in conjunction with processor 120 and/or memory 122) can communicate the command to operate a motor of the windshield wiper. As described, this can include operating the motor of the windshield wiper for a period of time, at a determined speed or intermittent delay, etc., which can be based on the detected environmental condition, a severity of the environmental condition, etc. Moreover, communicating the command to operate the motor of the windshield wiper can be based on determining whether the location of the vehicle is indoor or outdoor. For example, if the vehicle is outdoor, operating the motor of the windshield wiper can occur more frequently if conditions causing condensation on the windshield persist, or can occur less frequently if conditions are such that the wiper motor is under a resistance load that exceeds a threshold (e.g., where the wiper is unable to effectively clear the condensation that can have formed as ice).

In another example, preconditioning the vehicle at block 306 can optionally include, at block 312, communicating a command to operate a motor or pump for dispensing fluid onto the windshield. For example, vehicle preconditioning system 110 (e.g., in conjunction with processor 120 and/or memory 122) can communicate the command to operate the motor or pump for dispensing fluid onto the windshield. As described, this can include operating the motor or pump for a period of time, at a determined interval, etc., which can be based on the detected environmental condition, a severity of the environmental condition, etc. Moreover, communicating the command to operate the motor or pump can be based on determining whether the location of the vehicle is indoor or outdoor. For example, if the vehicle is outdoor, operating the motor or pump can occur more frequently if conditions causing condensation on the windshield persist, or can occur less frequently if conditions are such that a wiper motor is under a resistance load that exceeds a threshold (e.g., where the wiper is unable to effectively clear the condensation that can have formed as ice, as further dispensing of fluid can cause additional ice to form on the windshield).

In another example, preconditioning the vehicle at block 306 can optionally include, at block 314, communicating a command to operate a motor or HVAC unit of a defroster. For example, vehicle preconditioning system 110 (e.g., in conjunction with processor 120 and/or memory 122) can communicate the command to operate the motor or HVAC unit of the defroster. As described, this can include operating the motor or HVAC unit for a period of time, at a determined interval, etc., which can be based on the detected environmental condition, a severity of the environmental condition, etc. Moreover, communicating the command to operate the motor or HVAC unit can be based on determining whether the location of the vehicle is indoor or outdoor. For example, if the vehicle is outdoor, operating the motor or HVAC unit of the defroster can occur more frequently if conditions causing condensation on the windshield persist.

Moreover, in an example, preconditioning the vehicle at block 306 can optionally include, at block 316, communicating a command to turn on headlights. For example, vehicle preconditioning system 110 (e.g., in conjunction with processor 120 and/or memory 122) can communicate the command to turn on headlights. This can occur, for example, to allow vehicle preconditioning system 110 to compare images from the camera 106 with and without the headlights on to detect the environmental condition (e.g., where the images are similar with headlights on and off, this can indicate that the environmental condition is present and/or is more severe than if the images are different as condensation can be blocking the windshield such that illumination of objects via the headlights is not sufficiently apparent from the images).

In a specific example, where vehicle preconditioning system 110 determines the location of the vehicle to be indoors, preconditioning can occur by communicating commands to vehicle systems using a configured set of parameters (e.g., for operating the windshield wiper motor, fluid dispenser motor or pump, defroster motor or HVAC unit, etc.), which can be configured at or otherwise specified by the vehicle preconditioning system 110 (e.g., based on factory settings), by an interface of the vehicle 102 via user settings, by remote device 104, etc. Where vehicle preconditioning system 110 determines the location of the vehicle to be outdoors, preconditioning can occur based on a different configured set of parameters and/or based on detecting one or more conditions of the corresponding vehicle systems.

For example, where vehicle preconditioning system 110 determines the location of the vehicle to be outdoors, vehicle preconditioning system 110 can take measures, during preconditioning, to prevent possible damage to a windshield wiper motor. For example, vehicle preconditioning system 110 can determine current weather and/or whether for a previous amount of time (e.g., previous 24 hours or less if the last vehicle operation was within the amount of time). In an example, vehicle preconditioning system 110 can determine the weather using telematics system 114 to communicate with a server that provides weather information and/or telematics system 114 can receive weather information as part of another vehicle system 118 (e.g., a navigation system, climate control system, etc.). In this example, vehicle preconditioning system 110 can determine if the weather includes snow, rain, below freezing temperatures, etc. Where vehicle preconditioning system 110 does not detect such conditions, vehicle preconditioning system 110 can precondition the vehicle based on the configured set of parameters, as described.

Where vehicle preconditioning system 110 does detect snow, rain (e.g., coupled with temperature below a threshold), freezing temperatures, etc., vehicle preconditioning system 110 can determine whether it is daytime or nighttime (e.g., based on a clock of the vehicle 102, which can include a GPS clock of the navigation system) and receive an image from camera 106. Vehicle preconditioning system 110, in this example, can also activate the headlights of the vehicle and receive another image from camera 106. Vehicle preconditioning system 110 can compare the images to determine a level of similarity, and can accordingly determine preconditioning parameters. For example, the more similar the pictures (especially at nighttime), the more severe the environmental condition (e.g., because illumination of the headlights is not detected through the windshield where the images from camera 106 with headlights on and off are substantially similar).

Based on comparing the images, in this example, vehicle preconditioning system 110 can activate the defroster (e.g., front and/or rear), or a corresponding motor, at a maximum speed and a maximum heat via the HVAC unit. In one example, vehicle preconditioning system 110 can wait until a temperature of washer fluid reaches a threshold temperature (e.g., by running the engine of the vehicle 102) before activating the defroster(s). Moreover, based on comparing the images, an amount of time the defroster is activated, a temperature of the washer fluid, etc., vehicle preconditioning system 110 can operate a motor to dispense the washer fluid on the windshield, and/or can activate the windshield wiper motor for a period of time (e.g., and/or at a certain speed, intermittent delay, time interval, etc.). After a period of time, camera 106 can take another image, and vehicle preconditioning system 110 can determine whether to continue certain preconditioning based on comparing the image to a previous image. In this example, where the vehicle is outdoors and freezing conditions are detected, vehicle preconditioning system 110 can stop the windshield wiper motor if the image does not substantially change, and/or if a detected load on the wiper motor exceeds a threshold, such to prevent damage to the wiper motor, wiper blades, etc.

In this example, vehicle preconditioning system 110 can wait a period of time (e.g., with the defroster activated), such as 5 minutes. Vehicle preconditioning system 110 can then again activate the wiper motor and/or fluid dispenser motor for a period of time, and again determine whether the image in camera 106 is substantially different than the previous image. If not, vehicle preconditioning system 110 can wait again and continue the process. When the image from camera 106 is substantially different that the previous image, vehicle preconditioning system 110 can continue preconditioning (e.g., continue activating the wiper motor, fluid dispenser motor or pump, defroster motor and/or HVAC unit, etc.) until two images from camera 106 (e.g., consecutive images) are substantially similar, which can indicate that the windshield is clear. Vehicle preconditioning system 110 can then also turn off the headlights.

In an example, at any time before, during, or after preconditioning, vehicle preconditioning system 110 can notify the remote device 104 of a status of preconditioning and/or request approval or guidance on how to proceed with preconditioning (e.g., requesting values for one or more parameters to operate the wiper motor, fluid dispenser motor or pump, defroster motor or HVAC unit, etc.). Thus, in one example, method 300 can optionally include, at block 318, sending a notification or status of the preconditioning to a remote device. In an aspect, vehicle preconditioning system 110 (e.g., in conjunction with processor 120, memory 122, and/or communications device 116) can send the notification or status of the preconditioning to the remote device 104. Moreover, method 300 can optionally include, at block 320, receiving a command from the remote device regarding the preconditioning. In an aspect, vehicle preconditioning system 110 (e.g., in conjunction with processor 120, memory 122, and/or communications device 116) can receive the command from the remote device 104 regarding the preconditioning. As described, the command can correspond to activating a vehicle system 118 (e.g, a motor, pump, HVAC unit, etc. of a wiper motor, fluid dispenser, defroster, etc.), parameters for activating the vehicle system 118, and/or the like. Vehicle preconditioning system 110 can obtain the command and/or related parameters, and can accordingly continue, begin, or cease preconditioning of the vehicle at block 306.

Figure 4:
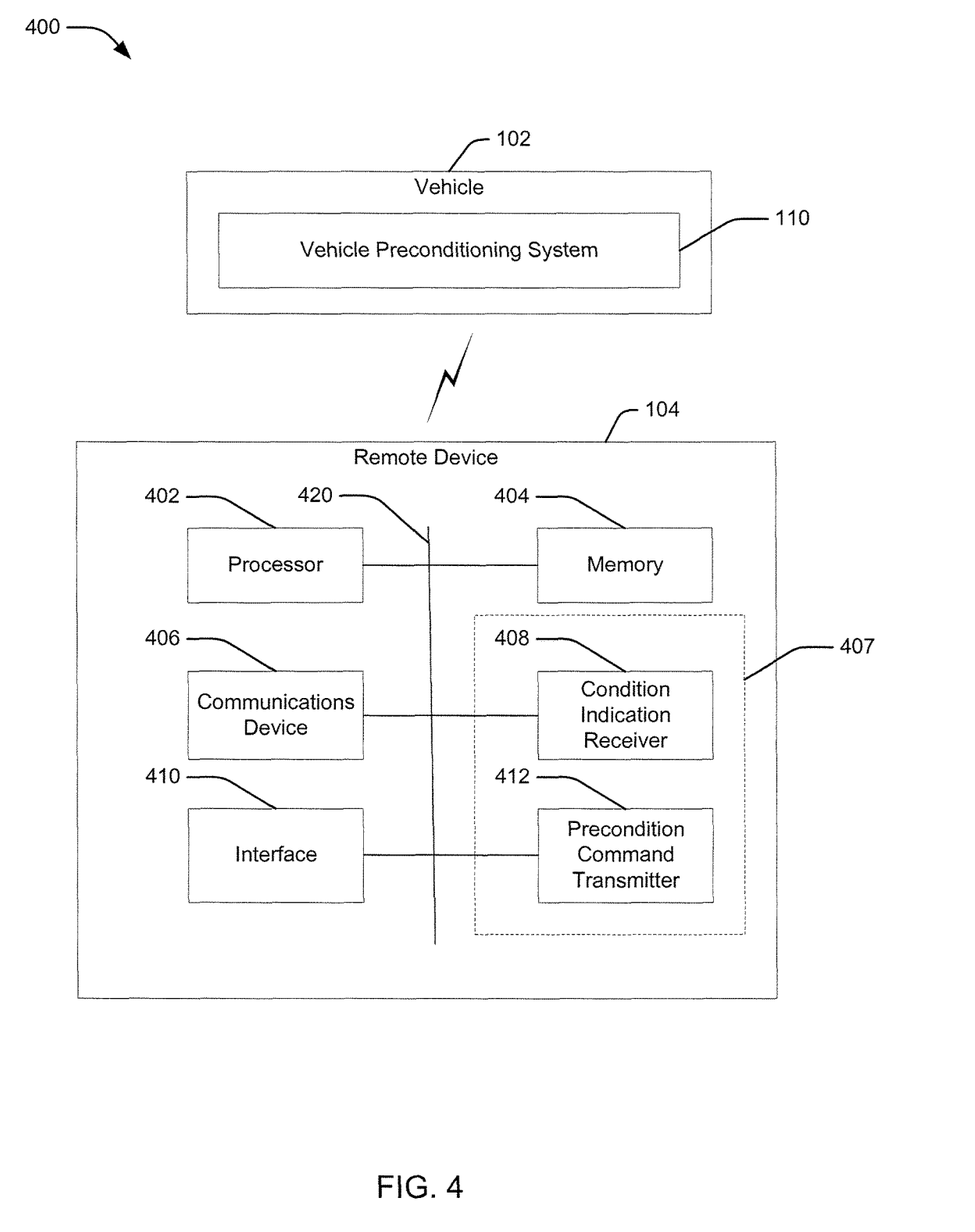
FIG. 4 illustrates a schematic view of an example operating environment of a remote device for preconditioning a vehicle according to one aspect of the disclosure.

FIG. 4 shows a schematic view of an example operating environment 400 of a vehicle preconditioning system 110 and remote device 104, and example methods according to aspects described herein. For example, operating environment 400 can include a vehicle 102 within which the vehicle preconditioning system 110 can reside, as similarly described above in FIG. 1. Operating environment 400 can also include a remote device 104 that can communicate with the vehicle 102 to receive data therefrom, issue commands to vehicle systems in the vehicle 102, among other functions. Components of the remote device 104 shown and described herein, as well as the components of other systems, hardware architectures and software architectures discussed herein, can be combined, omitted or organized into different architectures for various aspects of the disclosure. However, the example aspects and configurations discussed herein focus on the operating environment 400 as illustrated in FIG. 4, with corresponding system components and related methods.

As shown in FIG. 4, remote device 104 can include or be operably coupled with (or executed by) one or more processors 402 and one or more memories 404, which can be similar to processor 120 and/or memory 122 described above. The one or more processors 402 and/or memories 404 can be used to execute, store instructions, and/or store related parameters for one or more additional components of the remote device 104. For example, remote device 104 can also include a communications device 406 for communicating with the vehicle 102 and/or other devices or systems via one or more wireless communication technologies (e.g., a cellular technology, LAN technology, short-range communication technology, etc.), as described, a condition indication receiver 408 for receiving an indication of an external condition at a vehicle 102 via communications device 406, an interface 410 for providing output and/or accepting input related to one or more applications executed by processor 402 (e.g., a touch screen interface, keyboard, mouse, display, etc.), and a precondition command transmitter 412 for transmitting a precondition command to the vehicle 102 via communications device 406. In one example, condition indication receiver 408 and precondition command transmitter 412 can be part of a preconditioning application 407 for receiving condition indications from a vehicle 102 and allowing remote preconditioning of the vehicle 102, as described herein. In one example, one or more of the processor(s) 402, memory(ies) 404, communications device 406, condition indication receiver 408, interface 410, and/or precondition command transmitter 412 can be connected via one or more buses 420, and/or can include one or more dedicated processors and/or memories, etc. Moreover, in an example, interface 410 can be or include a remotely located interface on a device communicating with remote device 104, such as an external display and a smart watch, among other devices.

Figure 5:
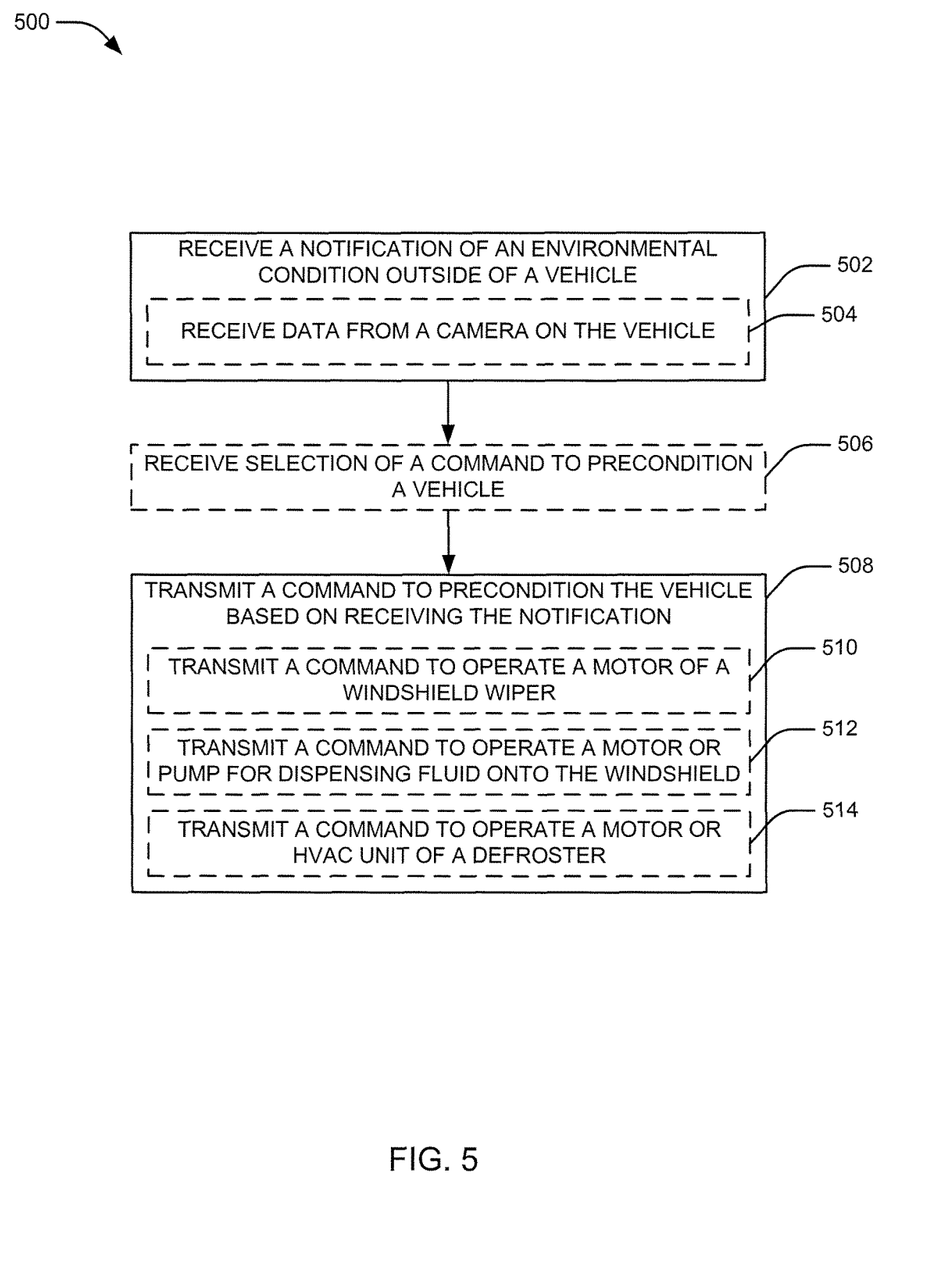
FIG. 5 illustrates a flowchart showing an example method for transmitting a command to precondition a vehicle according to one aspect of the disclosure.

Referring now to FIG. 5, which is described in conjunction with the example operating environment 400 of FIG. 4, an example method 500 for preconditioning vehicle (e.g., which can be used by the remote device 104) is illustrated. In block 502, the method 500 can include receiving a notification of an environmental condition outside of a vehicle. In an aspect, communications device 406 (e.g., in conjunction with processor 402 and/or memory 404) can receive the notification of the environmental condition outside of the vehicle 102 from the vehicle 102 (e.g., from a telematics system 114 described in FIG. 1). In an example, communications device 406 can provide notification and/or related information to condition indication receiver 408 of the preconditioning application 407. For example, the notification can include one or more parameters identifying the condition and/or aspects thereof, such as a level of condensation on a windshield of the vehicle 102. In an example, preconditioning application 407 can cause an indication of the notification to appear on interface 410 of the remote device 104 (e.g., as a pop-up or system notification based on which an audible alert and/or visible alert can be rendered on remote device 104 and/or a related device communicating with the remote device 104, such as a smart watch).

In an example, in block 504, receiving the notification can include receiving data from a camera on the vehicle. In an aspect, communications device 406 (e.g., in conjunction with processor 402 and/or memory 404) can receive the data from the camera on the vehicle 102 (e.g., from a camera facing outwardly towards a windshield, side or rear window, sunroof, etc., as described herein). For example, the data can include one or more images, a video feed, thermal data, etc., which can be rendered on interface 410 by the preconditioning application 407 executing on remote device 104. Thus, a user can view the camera data for determining whether or not to precondition the vehicle 102, in one example.

In block 506, method 500 can optionally include receiving a selection of a command to precondition a vehicle. In an aspect, preconditioning application 407 (e.g., in conjunction with processor 402, memory 404, and/or interface 410) can receive the selection of the command to precondition the vehicle. For example, preconditioning application 407 can display one or more options of commands for preconditioning the vehicle, which can be based on the notification of the environmental condition or otherwise. For example, the commands can include one or more actions to be performed by a vehicle system of the vehicle 102, related parameters for performing the actions, etc. In a specific example, the one or more actions can include operating a motor of a windshield wiper, where related parameters can include a time period, time interval, speed or intermittent delay setting, etc., for operating the motor of the windshield wiper. In another specific example, the one or more actions can include operating a motor or pump of a fluid dispenser, where related parameters can include a time period, time interval, amount of fluid to dispense, etc., for operating the motor or pump of the fluid dispenser. In another specific example, the one or more actions can include operating a motor and/or HVAC control of a defroster, where related parameters can include a time period, time interval, temperature, etc., for operating the motor and/or HVAC control of the defroster. In one example, a related parameter can include issuing the command until the vehicle preconditioning system 110 no longer detects the environmental condition.

In block 508, method 500 can include transmitting a command to precondition the vehicle based on receiving the notification. In an aspect, communications device 406 (e.g., in conjunction with processor 402 and/or memory 404) can transmit the command to precondition the vehicle 102 based on receiving the notification. In one example, precondition command transmitter 412 can transmit the command via communications device 406 automatically based on the notification (e.g., based on an indicated level of condensation) and/or based on selection of a command as described in block 406. Thus, for example, precondition command transmitter 412 can include one or more parameters regarding performing the command in transmitting the command, as described herein.

In block 510, transmitting the command can include transmitting a command to operate a motor of a windshield wiper. In an aspect, communications device 406 (e.g., in conjunction with processor 402 and/or memory 404) can transmit the command to operate the motor of the windshield wiper to vehicle 102, as described herein, which can include one or more related parameters for operating the windshield wiper. For example, a telematics system 114 at the vehicle 102 can receive the command (and/or one or more related parameters) and accordingly operate the motor of the windshield wiper (or other wiper), as described above. This can include operating the motor for a time period, time interval, at a speed or intermittent delay setting, etc.

In block 512, transmitting the command can include transmitting a command to operate a motor or pump for dispensing fluid onto the windshield. In an aspect, communications device 406 (e.g., in conjunction with processor 402 and/or memory 404) can transmit the command to operate the motor or pump for dispensing fluid onto the windshield to vehicle 102, as described herein, which can include one or more related parameters for operating the motor or pump for dispensing fluid. For example, a telematics system 114 at the vehicle 102 can receive the command (and/or one or more related parameters)and accordingly operate the motor or pump for dispensing fluid on the windshield (and/or on another window, headlamp, or other area), as described above. This can include operating the motor or pump for a time period, time interval, to dispense a specified amount of fluid, etc.

In block 514, transmitting the command can include transmitting a command to operate a motor or HVAC unit of a defroster. In an aspect, communications device 406 (e.g., in conjunction with processor 402 and/or memory 404) can transmit the command to operate the motor or HVAC unit of the defroster to vehicle 102, as described herein, which can include one or more related parameters for operating the defroster. For example, a telematics system 114 at the vehicle 102 can receive the command (and/or one or more related parameters)and accordingly operate the motor or HVAC unit of the defroster (e.g., the defroster for the windshield, another window, headlamp, mirror, etc), as described above. This can include operating the motor or HVAC unit for a time period, time interval, and at a temperature, among other factors.

Aspects of the present disclosure can be implemented using hardware, software, or a combination thereof and can be implemented in one or more computer systems or other processing systems. In one aspect, the disclosure is directed toward one or more computer systems capable of carrying out the functionality described herein. An example of such a computer system 600 is shown in FIG. 6.

Figure 6:
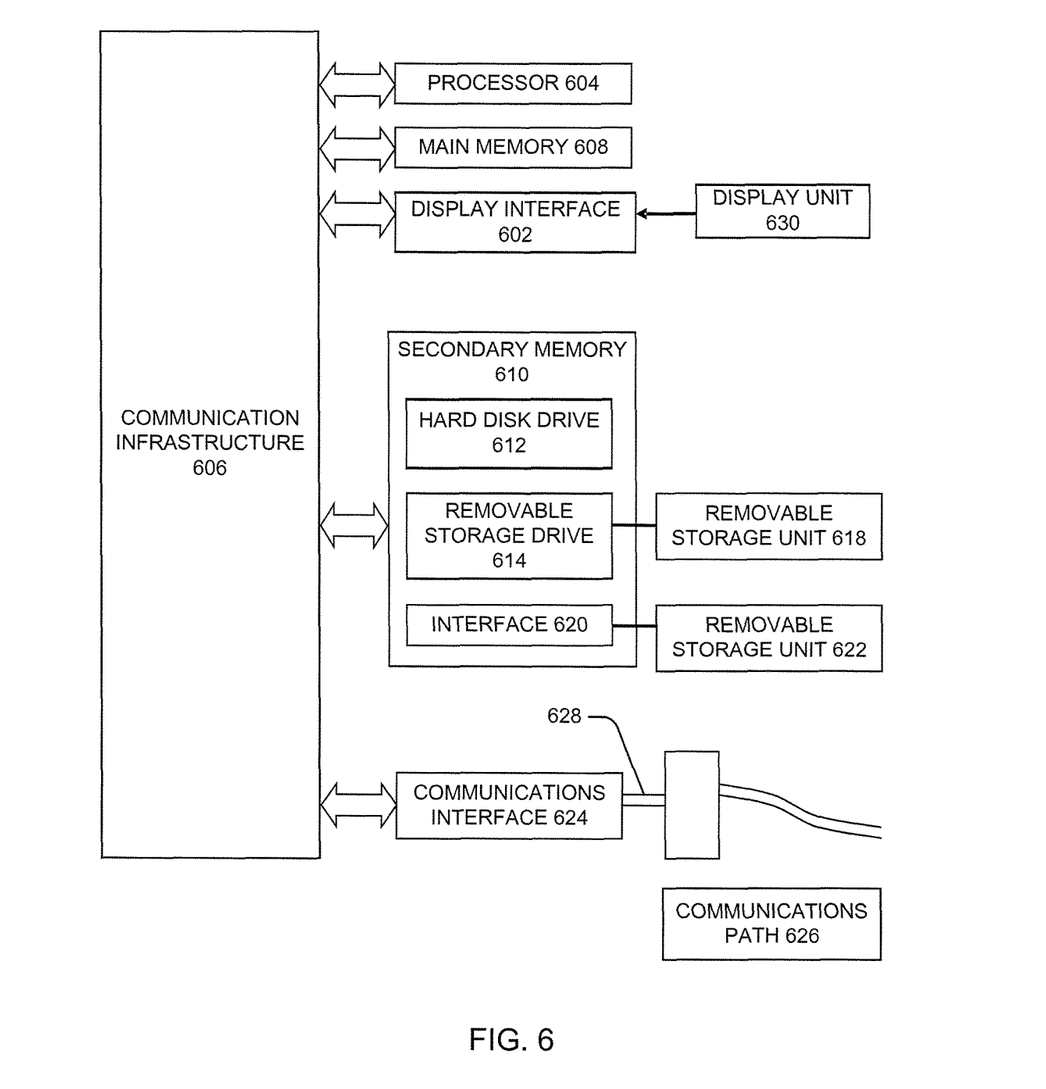
FIG. 6 presents an example system diagram of various hardware components and other features according to one aspect of the disclosure.

FIG. 6 presents an example system diagram of various hardware components and other features, for use in accordance with an aspect of the present disclosure. Aspects of the present disclosure can be implemented using hardware, software, or a combination thereof and can be implemented in one or more computer systems or other processing systems. In one example variation, aspects described herein can be directed toward one or more computer systems capable of carrying out the functionality described herein. An example of such a computer system 600 is shown in FIG. 6.

Computer system 600 includes one or more processors, such as processor 604.

The processor 604 is connected to a communication infrastructure 606 (e.g., a communications bus, cross-over bar, or network). In one example, processor 120, 402 can include processor 604. Various software aspects are described in terms of this example computer system. After reading this description, it will become apparent to a person skilled in the relevant art(s) how to implement aspects described herein using other computer systems and/or architectures.

Computer system 600 can include a display interface 602 that forwards graphics, text, and other data from the communication infrastructure 606 (or from a frame buffer not shown) for display on a display unit 630. Interface 410 can include display interface 602, in one example. Computer system 600 also includes a main memory 608, preferably random access memory (RAM), and can also include a secondary memory 610. The secondary memory 610 can include, for example, a hard disk drive 612 and/or a removable storage drive 614, representing a floppy disk drive, a magnetic tape drive, an optical disk drive, etc. The removable storage drive 614 reads from and/or writes to a removable storage unit 618 in a well-known manner. Removable storage unit 618, represents a floppy disk, magnetic tape, optical disk, etc., which is read by and written to removable storage drive 614. As will be appreciated, the removable storage unit 618 includes a computer usable storage medium having stored therein computer software and/or data.

In alternative aspects, secondary memory 610 can include other similar devices for allowing computer programs or other instructions to be loaded into computer system 600. Such devices can include, for example, a removable storage unit 622 and an interface 620. Examples of such can include a program cartridge and cartridge interface (such as that found in video game devices), a removable memory chip (such as an erasable programmable read only memory (EPROM), or programmable read only memory (PROM)) and associated socket, and other removable storage units 622 and interfaces 620, which allow software and data to be transferred from the removable storage unit 622 to computer system 600. In an example, memory 122, 404 can include one or more of main memory 608, secondary memory 610, removable storage drive 614, removable storage unit 618, removable storage unit 622, etc.

Computer system 600 can also include a communications interface 624.

Communications interface 624 allows software and data to be transferred between computer system 600 and external devices. Examples of communications interface 624 can include a modem, a network interface (such as an Ethernet card), a communications port, a Personal Computer Memory Card International Association (PCMCIA) slot and card, etc. Software and data transferred via communications interface 624 are in the form of signals 628, which can be electronic, electromagnetic, optical or other signals capable of being received by communications interface 624. These signals 628 are provided to communications interface 624 via a communications path (e.g., channel) 626. This path 626 carries signals 628 and can be implemented using wire or cable, fiber optics, a telephone line, a cellular link, a radio frequency (RF) link and/or other communications channels. In this document, the terms "computer program medium" and "computer usable medium" are used to refer generally to media such as a removable storage drive 680, a hard disk installed in hard disk drive 670, and signals 628. These computer program products provide software to the computer system 600. Aspects described herein can be directed to such computer program products. Communications device 116, 406 can include communications interface 624.

Computer programs (also referred to as computer control logic) are stored in main memory 608 and/or secondary memory 610. Computer programs can also be received via communications interface 624. Such computer programs, when executed, enable the computer system 600 to perform various features in accordance with aspects described herein. In particular, the computer programs, when executed, enable the processor 604 to perform such features. Accordingly, such computer programs represent controllers of the computer system 600. Computer programs can include preconditioning application 407.

In variations where aspects described herein are implemented using software, the software can be stored in a computer program product and loaded into computer system 600 using removable storage drive 614, hard disk drive 612, or communications interface 620. The control logic (software), when executed by the processor 604, causes the processor 604 to perform the functions in accordance with aspects described herein as described herein. In another variation, aspects are implemented primarily in hardware using, for example, hardware components, such as application specific integrated circuits (ASICs). Implementation of the hardware state machine so as to perform the functions described herein will be apparent to persons skilled in the relevant art(s).

In yet another example variation, aspects described herein are implemented using a combination of both hardware and software.

Figure 7:
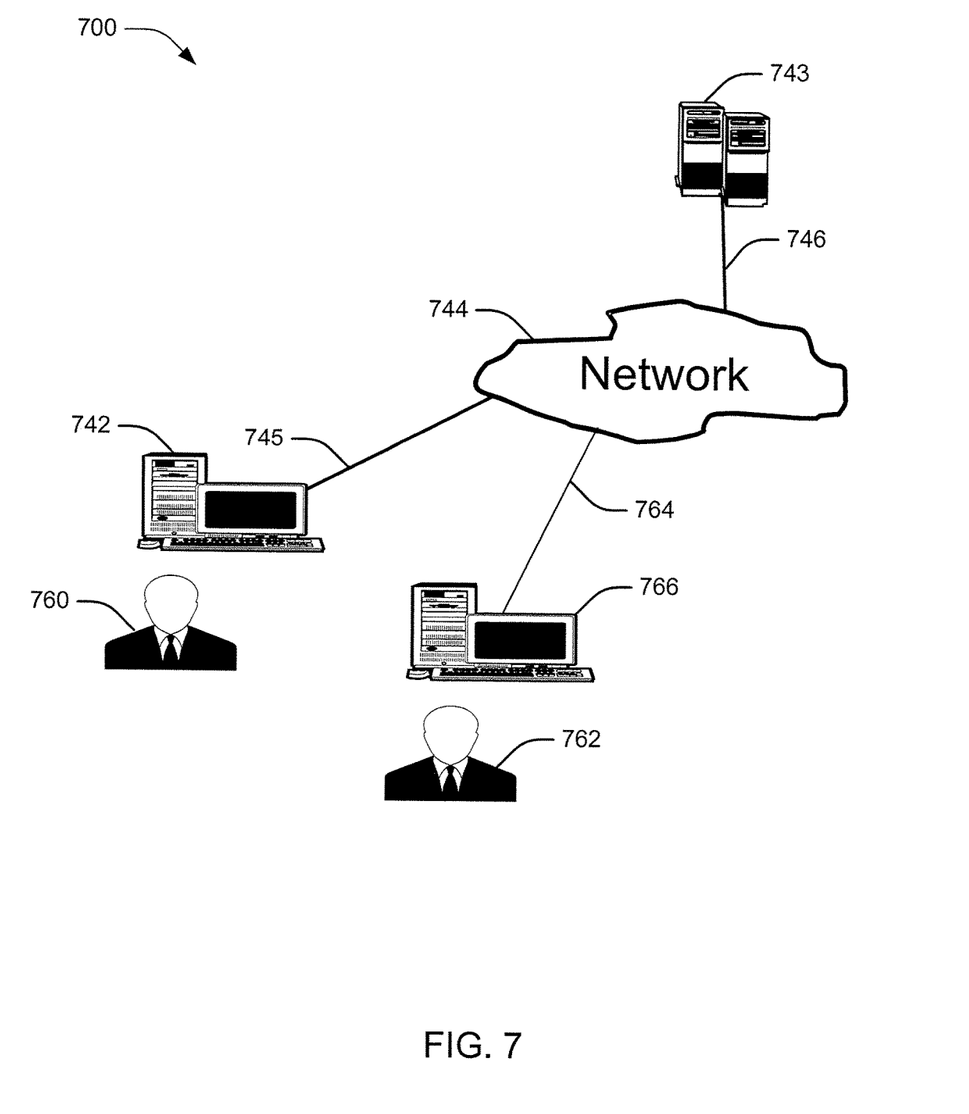
FIG. 7 is a block diagram of various example system components according to one aspect of the disclosure.

FIG. 7 is a block diagram of various example system components, in accordance with an aspect. FIG. 7 shows a communication system 700 usable in accordance with aspects described herein. The communication system 700 includes one or more accessors 760, 762 (also referred to interchangeably herein as one or more "users") and one or more terminals 742, 766. For example, terminals 742, 766 can include vehicle 102 or a related system (e.g., vehicle preconditioning system 110, processor 120, communications device 116, etc.), remote device 104 (processor 402, communications device 406, etc.), and/or the like. In one aspect, data for use in accordance with aspects described herein is, for example, input and/or accessed by accessors 760, 762 via terminals 742, 766, such as personal computers (PCs), minicomputers, mainframe computers, microcomputers, telephonic devices, or wireless devices, such as personal digital assistants ("PDAs") or a hand-held wireless devices coupled to a server 743, such as a PC, minicomputer, mainframe computer, microcomputer, or other device having a processor and a repository for data and/or connection to a repository for data, via, for example, a network 744, such as the Internet or an intranet, and couplings 745, 746, 764. The couplings 745, 746, 764 include, for example, wired, wireless, or fiberoptic links. In another example variation, the method and system in accordance with aspects described herein operate in a stand-alone environment, such as on a single terminal.

The aspects discussed herein can also be described and implemented in the context of computer-readable storage medium storing computer-executable instructions. Computer-readable storage media includes computer storage media and communication media. For example, flash memory drives, digital versatile discs (DVDs), compact discs (CDs), floppy disks, and tape cassettes. Computer-readable storage media can include volatile and nonvolatile, removable and non-removable media implemented in any method or technology for storage of information such as computer readable instructions, data structures, modules or other data.

It will be appreciated that various implementations of the above-disclosed and other features and functions, or alternatives or varieties thereof, can be desirably combined into many other different systems or applications. Also that various presently unforeseen or unanticipated alternatives, modifications, variations, or improvements therein can be subsequently made by those skilled in the art which are also intended to be encompassed by the following claims.

What is claimed is:

1. A method of preconditioning a vehicle, comprising:
    detecting an environmental condition outside of the vehicle via a camera;
    sending, via a telematics system and using a wireless communication technology, a notification of the environmental condition to a remote device, wherein the remote device couples to the telematics system or a vehicle system of the vehicle via the wireless communication technology;
    receiving, via the telematics system, a command from the remote device in response to the notification, wherein the command is related to a vehicle system of the vehicle; and
    communicating the command to the vehicle system to cause a preconditioning of the vehicle,
    wherein the preconditioning of the vehicle comprises determining, based on determining whether the vehicle is at an indoor or outdoor location, one or more parameters for the preconditioning, and operating one or more components of the vehicle based on the one or more parameters to precondition the vehicle.

2. The method of claim 1, wherein detecting the environmental condition comprises detecting a level of condensation on a windshield of the vehicle via data from the camera, wherein the camera is configured to capture the data from inside of the vehicle.

3. The method of claim 1, wherein the command corresponds to operating a motor for a windshield wiper of the vehicle.

4. The method of claim 3, wherein the command specifies at least one of a speed, an intermittent delay, a time period, or a time interval for operating the motor of the windshield wiper.

5. The method of claim 1, wherein the command corresponds to operating a motor or pump for dispensing fluid onto a windshield.

6. The method of claim 5, wherein the command specifies a time period or a time interval for operating the motor or pump.

7. The method of claim 1, wherein the command corresponds to operating a motor for a defroster.

8. The method of claim 7, wherein the command specifies a time period, a time interval, or temperature for operating the defroster.

9. The method of claim 1, wherein the remote device is not physically attached to the vehicle or the vehicle system.

10. The method of claim 1, wherein communicating the command comprises communicating the command to the vehicle system until the environmental condition is no longer detected via the camera.

11. The method of claim 1, wherein the camera is an infrared camera or a visible camera.

12. The method of claim 1, wherein determining whether the vehicle is at an indoor or outdoor location comprises determining the indoor or outdoor location of the vehicle based on GPS signals.

13. A vehicle comprising:
a vehicle preconditioning system, comprising:
a camera for detecting an environmental condition outside of the vehicle;
a telematics system for sending, using a wireless communication technology, a notification of the environmental condition to a remote device, wherein the remote device couples to the telematics system or a vehicle system of the vehicle via the wireless communication technology, and receiving a command from the remote device in response to the notification, wherein the command is related to a vehicle system of the vehicle; and
an electronic control unit for communicating with at least one vehicle system, wherein the electronic control unit communicates the command to the vehicle system to cause a preconditioning of the vehicle,
wherein the command to cause preconditioning of the vehicle includes one or more parameters for preconditioning that are based on determining whether the vehicle is at an indoor or outdoor location, and wherein the electronic control unit operates one or more components of the vehicle based on the one or more parameters to precondition the vehicle.

14. The vehicle of claim 13, wherein the vehicle preconditioning system detects the environmental condition based on detecting a level of condensation on a windshield of the vehicle via data from the camera, wherein the camera is configured to capture the data from inside of the vehicle.

15. The vehicle of claim 13, wherein the command corresponds to operating a motor for a windshield wiper of the vehicle, and wherein the electronic control unit communicates with the at least one vehicle system to operate the motor for the windshield wiper.

16. The vehicle of claim 15, wherein the command specifies at least one of a speed, an intermittent delay, a time period, or a time interval for operating the motor of the windshield wiper, and wherein the electronic control unit communicates with the at least one vehicle system to operate the motor for the windshield wiper based on at least one of the speed, the intermittent delay, the time period, or the time interval.

17. The vehicle of claim 13, wherein the command corresponds to operating a motor or pump for dispensing fluid onto a windshield, and wherein the electronic control unit communicates with the at least one vehicle system to operate the motor or pump.

18. The vehicle of claim 13, wherein the command corresponds to operating a motor for a defroster, and wherein the electronic control unit communicates with the at least one vehicle system to operate the motor for the defroster.

19. The vehicle of claim 13, wherein the camera sends an image to the remote device via the telematics system.

20. A non-transitory computer-readable medium storing computer executable code for preconditioning a vehicle, comprising code for:
detecting an environmental condition outside of the vehicle via a camera;
sending, via a telematics system and using a wireless communication technology, a notification of the environmental condition to a remote device, wherein the remote device couples to the telematics system or a vehicle system of the vehicle via the wireless communication technology;
receiving, via the telematics system, a command from the remote device in response to the notification, wherein the command is related to a vehicle system of the vehicle; and
communicating the command to the vehicle system to cause a preconditioning of the vehicle,
wherein the preconditioning of the vehicle comprises determining, based on determining whether the vehicle is at an indoor or outdoor location, one or more parameters for the preconditioning, and operating one or more components of the vehicle based on the one or more parameters to precondition the vehicle.

* * * * *